(12) United States Patent
Sayed et al.

(10) Patent No.: US 7,360,842 B2
(45) Date of Patent: Apr. 22, 2008

(54) SHINGLE RECLINER COVER

(75) Inventors: Rami Z. Sayed, Farmington Hills, MI (US); Dino Nardicchio, Bloomfield, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 205 days.

(21) Appl. No.: 10/577,960

(22) PCT Filed: Nov. 17, 2004

(86) PCT No.: PCT/CA2004/001972

§ 371 (c)(1),
(2), (4) Date: May 2, 2006

(87) PCT Pub. No.: WO2005/047055

PCT Pub. Date: May 26, 2005

(65) Prior Publication Data

US 2007/0080574 A1    Apr. 12, 2007

(51) Int. Cl.
*B60N 2/22* (2006.01)
(52) U.S. Cl. .............................. 297/463.1; 297/452.38; 297/463.2
(58) Field of Classification Search ................ 297/362, 297/367, 452.38, 463.1, 463.2
See application file for complete search history.

(56) References Cited

U.S. PATENT DOCUMENTS

| | | | |
|---|---|---|---|
| 4,909,572 A | * | 3/1990 | Kanai .................... 297/452.38 |
| 5,002,339 A | | 3/1991 | Yamashita et al. |
| 5,007,682 A | * | 4/1991 | Kuwabara et al. ..... 297/452.38 |
| 5,288,133 A | * | 2/1994 | Mizushima et al. ... 297/452.38 |
| 5,788,331 A | * | 8/1998 | Aufrere et al. ........ 297/452.18 |
| 7,237,846 B1 | * | 7/2007 | Arima .................... 297/452.38 |

FOREIGN PATENT DOCUMENTS

| | | |
|---|---|---|
| JP | 9276063 | 10/1997 |
| JP | 2000175756 A | 6/2000 |
| JP | 2001061587 A | 3/2001 |

OTHER PUBLICATIONS

English Abstract of JP-2000175756 A.
English Abstract of JP-2001061587 A.
English Abstract of JP 9276063.

* cited by examiner

*Primary Examiner*—Peter R Brown
(74) *Attorney, Agent, or Firm*—Clark Hill PLC

(57) ABSTRACT

A recliner cover assembly for enclosing a recliner mechanism of an automotive seat wherein the recliner mechanism includes an upper arm pivotally coupled to a lower arm. The recliner cover assembly comprises a housing defined by facing first and second molded members forming a cavity therebetween for encasing at least a portion of the recliner mechanism and a separate shingle cover slidably coupled between the first and second molded members wherein the shingle cover is coupled to the upper arm of the recliner mechanism for movement concomitantly therewith to continuously cover the recliner mechanism encased with the housing.

10 Claims, 3 Drawing Sheets

SHINGLE RECLINER COVER

FIELD OF THE INVENTION

This invention relates to a recliner cover, and more particularly to a recliner cover for enclosing and protecting a seat recliner mechanism.

BACKGROUND OF THE INVENTION

Automotive seat assemblies generally include a seat cushion connected to a seat back. The seat back is normally pivotally adjustable relative to the seat cushion to provide for a plurality of positions of the seat back. In this manner, a user can adjust the seat back to a desired inclined seating position or a stowed position overlying the seat cushion.

Recliner mechanisms generally couple the seat back to the seat cushion and allow for pivotal movement of the seat back relative to the seat cushion. The recliner mechanisms generally comprise pair of pivotally interconnected metal components or hinge members fixedly secured to and between the seat cushion and seat back. The recliner mechanism is generally not exposed, thereby preventing contamination by foreign particles, as well as concealing "pinch point" areas where a user may interact with the mechanism.

Various attempts have been made in the prior art to provide barriers for recliner mechanisms including brushes or bristle-like members applied to an area of a molded trim piece, or a cover, that overlaps the recliner mechanism. The brushes require an additional operation to heat stake or overmold the brushes to the molded trim piece. Also, the brushes provide for limited coverage of the mechanisms, not completely protecting a user from "pinch point" conditions. Often, the bristles may get caught in the mechanisms jamming the recliner and preventing the ability to adjust the seat back relative to the seat cushion.

Thermal plastic elastomer members have been also been used in the art to cover a recliner mechanism. The thermal plastic members are very costly to produce, requiring complex tooling and expensive raw materials. The elastomer material is also prone to wear, resulting in the breakdown of the article, which can bind the recliner mechanism, as well. The elastomer members also have the disadvantage of not staying in place as they are often just pulled over the recliner mechanism as a boot, thereby allowing gaps for possible "pinch point" conditions.

There is therefore a need in the art for a recliner cover that prevents exposure of the recliner mechanism to a user, as well as is easy to manufacture at a reasonable cost and is aesthetically pleasing.

SUMMARY OF THE INVENTION

According to one aspect of the invention, there is provided a recliner cover assembly for enclosing a recliner mechanism of an automotive seat wherein the recliner mechanism includes an upper arm pivotally coupled to a lower arm. The recliner cover assembly comprises a housing defined by facing first and second molded members forming a cavity therebetween for encasing at least a portion of the recliner mechanism and a separate shingle cover slidably coupled between the first and second molded members wherein the shingle cover is adapted to be coupled to the upper arm of the recliner mechanism for movement concomitantly therewith to continuously cover the recliner mechanism encased with the housing.

DETAILED DESCRIPTION OF THE PREFERRED EMBODIMENTS

Figure 1:
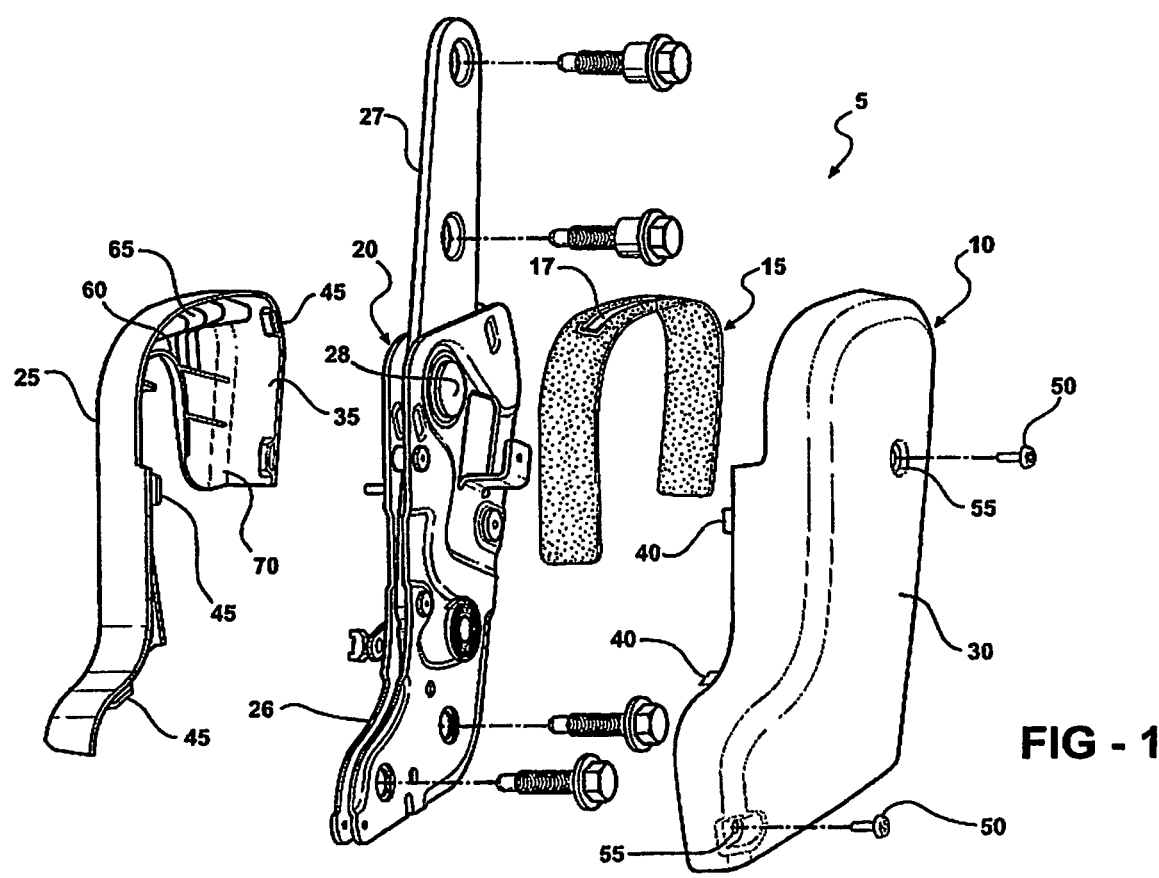
FIG. 1 is an exploded view of a first embodiment of the recliner cover assembly of the present invention.

Referring to FIG. 1, there is shown a first embodiment of a recliner cover assembly 5 according to the present invention for use. The recliner cover assembly 5 includes a housing 10 and a moveable shingle cover 15 disposed within the housing 10. The recliner cover assembly 5 encloses a recliner mechanism 20 which is adapted to be secured between a seat back and seat cushion of an automotive seat assembly for pivoting the seat back between a plurality of positions relative to the seat cushion.

With respect to the first embodiment, the housing 10 preferably comprises two pieces including inner and outer molded members 25, 30. In a preferred aspect of the present invention, the inner and outer molded members 25, 30 comprise a polymer material and even more preferably a rigid polymer material such as polypropylene.

As shown in FIG. 1, the recliner mechanism 20 is disposed within a cavity 35 formed by the mating of the inner and outer molded members 25, 30. More specifically, the recliner mechanism 20 includes a lower arm 26 adapted to be fixedly secured to the seat cushion and an upper arm 27 adapted to be fixedly secured to the seat back. The upper arm 27 is pivotally interconnected to the lower arm 26 by a pivot joint 28. The inner and outer molded members 25, 30 enclose the lower arm 26, pivot joint 28 and part of the upper arm 27 within the cavity 35. In a preferred aspect, the inner and outer molded members 25, 30 include snap tabs 40 that are received within slots 45 of the opposing inner or outer members 25, 30. The snap tabs 40 provide a simple mechanism to connect the inner and outer molded members 25, 30. The inner and outer molded members 25, 30 are connected to the recliner mechanism 20 using appropriate fasteners. In a preferred aspect, screws 50 are disposed in apertures 55 formed in the outer molded member 30 and are used to connect the inner and outer molded members 25, 30 with the recliner mechanism 20.

Again referring to FIG. 1, the moveable shingle cover 15 is separately or independently disposed within the housing 10. The shingle cover 15 includes an elongated slot 17 formed therein for receiving the upper arm 27 of the recliner mechanism 20 therethrough. The shingle cover 15 preferably comprises a flexible polymer material allowing it to bend around the contours of the housing 10, as will be discussed in more detail below. In a preferred aspect of the present invention, the shingle cover 15 comprises a polyester blend.

The moveable shingle cover 15 is disposed within the housing 10 and slidably guided along a channel or track 60 formed by a plurality ribs 65 disposed on the inner surfaces 70 of the inner and outer molded members 25, 30. The ribs 65 define a travel path of the moveable shingle cover 15. The moveable shingle cover 15 travels freely along the channel or track 60 relative to the stationary housing 10 as the upper arm 27 of the recliner mechanism 20 pivots relative to the lower arm 26. In this manner all "pinch points" of the recliner mechanism are protected and concealed for access, and the recliner mechanism 20 is isolated or enclosed such that foreign materials cannot bind the recliner mechanism 20.

In use, as the upper arm 27 pivots about the pivot joint 28 relative to the lower arm 26, it moves within the slot 17 formed in the moveable shingle cover 15 thereby concomitantly moving the shingle cover 15 with the upper arm 27 such that the recliner mechanism 20, particularly the pivot joint 28, is isolated or covered at all times. As the upper arm 27 moves, the shingle cover 15 travels along the path of the channel or track 60 defined by the ribs 65 formed on the inner and outer molded members 25, 30. The flexible properties of the shingle cover 15 allows for movement along the curvaceous path without binding with the housing 10. Additionally, the independent or separate shingle cover 15 is free to slide along the channel or track 60 between the mating inner and outer molded members 25, 30 in response to pivotal movement of the upper arm 27 relative to the lower arm 26 of the recliner mechanism 20.

Figure 3A:
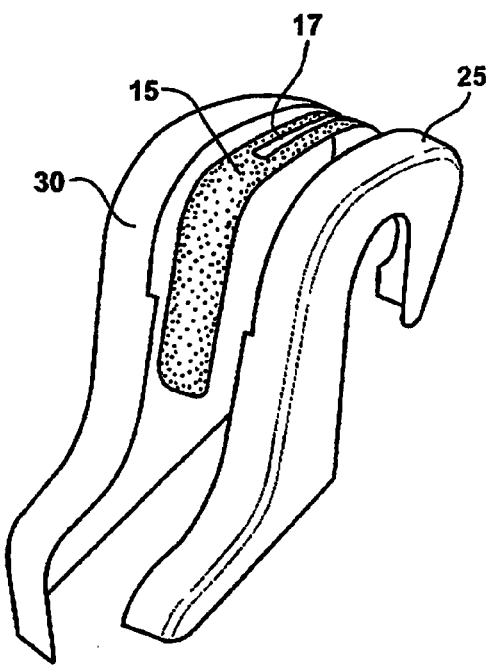
FIGS. 3A and 3B are assembled perspective views of the first embodiment of the recliner cover assembly.
Figure 3B:
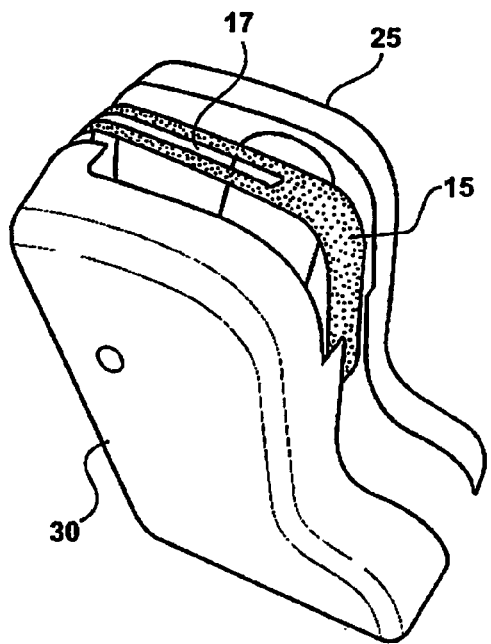

FIGS. 3A and 3B illustrate the housing 10 and moveable shingle cover 15 without the recliner mechanism 20.

Figure 2:
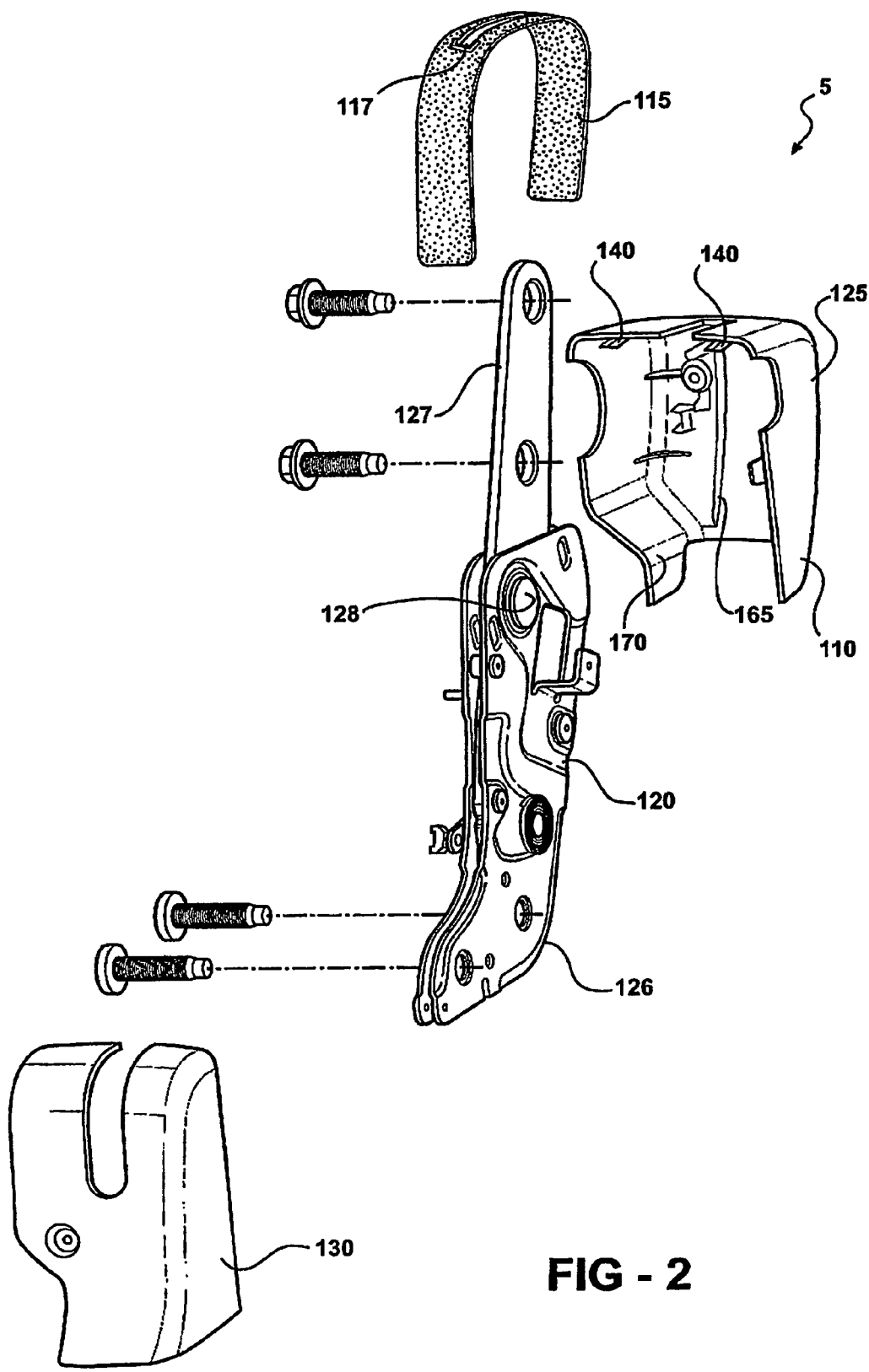
FIG. 2 is an exploded view of a second embodiment of the recliner cover assembly of the present invention.
Figure 3C:
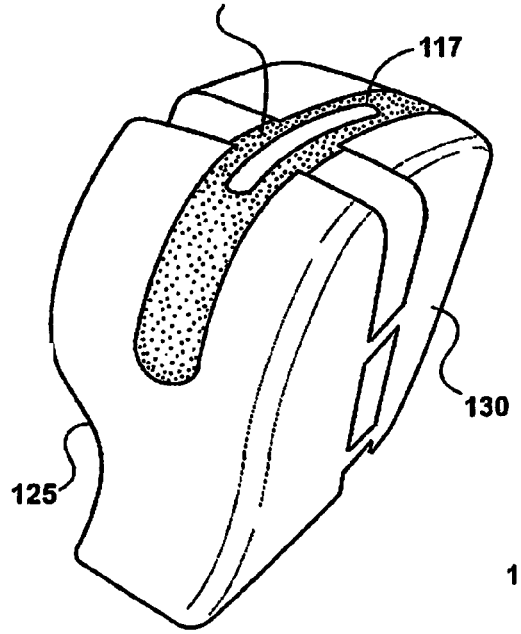
FIGS. 3C and 3D are assembled perspective view of the second embodiment of the recliner cover assembly.
Figure 3D:
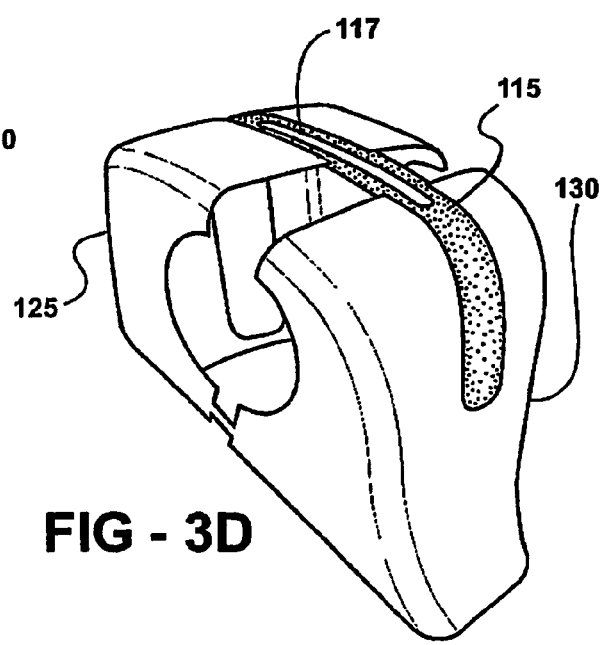

Referring to FIGS. 2, 3C and 3D there is shown a second embodiment of a recliner cover assembly 5 according to the present invention. The second embodiment may be utilized when a split bench or other seating arrangement is used requiring a center recliner mechanism 120. As with the previously described first embodiment, the second embodiment of the recliner cover assembly 5 includes a housing 100 and a moveable shingle cover 115 independently an and slidably disposed within the housing 100. A recliner mechanism 120 is enclosed within the housing 100 and includes an upper arm 127 and a lower arm 126 pivotally interconnected by a pivot joint 128 and moveable to a plurality of positions. However, due to the use of the second embodiment, with a center recliner mechanism 120, the housing 110 comprises forward and rear molded members 130, 125, as opposed to inner and outer molded members 25, 30, as described with respect to the first embodiment. As with the previously described first embodiment, the moveable shingle cover 115 is slidably disposed within the housing 110 and travels on a track or path defined by ribs 165 formed on inner surfaces 170 of the front and rear molded members 130, 125. As with the previously described first embodiment, the shingle cover 115 includes an elongated slot 117 that receives the upper arm 127 of the recliner mechanism 120 such that the recliner mechanism 120 and moveable shingle cover 115 move concomitantly and relative to the housing 100.

Again, snap tabs 140 are used to mate the front 130 and rear 125 molded members, as with the previously described first embodiment. The preferred materials of the previously described first embodiment are utilized by the second embodiment, as well.

The invention has been described in an illustrative manner, and it is to be understood that the terminology, which has been used, is intended to be in the nature of words of description rather than of limitation.

Obviously, many modifications and variations of the present invention are possible in light of the above teachings. It is, therefore, to be understood that within the scope of the appended claims, the invention may be practiced other than as specifically described.

What is claimed is:

1. A recliner cover assembly for enclosing a recliner mechanism of an automotive seat wherein the recliner mechanism includes an upper arm pivotally coupled to a lower arm, said recliner cover assembly comprising:
   a housing defined by facing first and second molded members forming a cavity therebetween for encasing at least a portion of the recliner mechanism; and
   a separate shingle cover slidably coupled between said first and second molded members wherein said shingle cover is adapted to be coupled to the upper arm of the recliner mechanism for movement concomitantly therewith to continuously cover the recliner mechanism encased with said housing.

2. A recliner cover assembly as set forth in claim 1 wherein said shingle cover includes a slot therein adapted to receive the upper arm of the recliner mechanism and couple said shingle cover to the recliner mechanism.

3. A recliner cover assembly as set forth in claim 2 wherein said first and second molded members include facing inner surfaces defining said cavity therebetween.

4. A recliner cover assembly as set forth in claim 3 wherein said housing includes a track for slidably supporting and guiding said shingle cover during movement along a predetermined path between said first and second molded members.

5. A recliner cover assembly as set forth in claim 4 wherein said track is defined by at least one rib projecting outwardly from said inner surface of said first and second molded members.

6. A recliner cover assembly as set forth in claim 5 wherein one of said first and second molded members includes a plurality of tabs and the other of said first and second molded members includes a plurality of slots for mating with said tabs to interconnect said first and second molded members.

7. A recliner cover assembly as set forth in claim 6 wherein at least one of said first and second molded members includes an aperture for receiving a fastener to fixedly secure said housing to the lower arm of recliner mechanism.

8. A recliner cover assembly as set forth in claim 7 wherein said first and second molded members are formed from molded polypropylene.

9. A recliner cover assembly as set forth in claim 8 wherein said shingle cover is formed from a flexible polyester blend.

10. A recliner cover assembly as set forth in claim 9 wherein said first and second molded members are adapted to be fixedly secured to the lower arm of the recliner mechanism and the shingle cover is adapted to be independently coupled to the pivotal upper arm of the recliner mechanism.

* * * * *